United States Patent
Watson et al.

(10) Patent No.: US 9,797,789 B2
(45) Date of Patent: Oct. 24, 2017

(54) STRAIN GAGES WITH DISCRETE ELECTRICAL RESISTANCE TRIMMING

(71) Applicant: VISHAY MEASUREMENTS GROUP, INC., Wendell, NC (US)

(72) Inventors: Robert B. Watson, Clayton, NC (US); Thomas P. Kieffer, Wake Forest, NC (US); Rebecca L. Showalter, Raleigh, NC (US)

(73) Assignee: Vishay Measurements Group, Inc., Wendell, NC (US)

( * ) Notice: Subject to any disclaimer, the term of this patent is extended or adjusted under 35 U.S.C. 154(b) by 130 days.

(21) Appl. No.: 14/758,917

(22) PCT Filed: Jan. 3, 2014

(86) PCT No.: PCT/US2014/010214
§ 371 (c)(1),
(2) Date: Jul. 1, 2015

(87) PCT Pub. No.: WO2014/107597
PCT Pub. Date: Jul. 10, 2014

(65) Prior Publication Data
US 2015/0338294 A1  Nov. 26, 2015

Related U.S. Application Data

(60) Provisional application No. 61/748,613, filed on Jan. 3, 2013.

(51) Int. Cl.
*G01L 1/00* (2006.01)
*G01L 1/22* (2006.01)
*H01C 17/23* (2006.01)

(52) U.S. Cl.
CPC ............ *G01L 1/2287* (2013.01); *H01C 17/23* (2013.01)

(58) Field of Classification Search
CPC ....... G01L 1/2287; H01C 17/22; H01C 17/23; H01C 17/24; H01C 17/2404; H01C 17/2408; H01C 17/2412; H01C 17/2416; H01C 17/242; H01C 17/245; G01B 7/18
See application file for complete search history.

(56) References Cited

U.S. PATENT DOCUMENTS

| 2,885,524 A | 5/1959 | Eisler |
| 5,394,019 A | 2/1995 | Audy |
| 2009/0205443 A1 | 8/2009 | Takeuchi |

FOREIGN PATENT DOCUMENTS

WO 2011/163442 A1  12/2011

OTHER PUBLICATIONS

Extended European Search Report communication dated Jul. 1, 2016 in corresponding European Application EP 14735238.

*Primary Examiner* — Blake A Tankersley
(74) *Attorney, Agent, or Firm* — Volpe and Koenig, P.C.

(57) ABSTRACT

An electrical resistance strain gage includes a uniformly distributed electrical resistance of the active measuring area and a discrete electrical trim resistance within an active measuring are. The trim resistance may include an electrical conductor in an electrically parallel circuit such that the electrical conductor may be selectively electrically removed from the strain gage to trim the electrical resistance of the strain gage. The trim resistance does not modify the active strain sensing area or uniform grid length.

14 Claims, 6 Drawing Sheets

STRAIN GAGES WITH DISCRETE ELECTRICAL RESISTANCE TRIMMING

CROSS REFERENCE TO RELATED APPLICATION

This application claims the benefit of U.S. Provisional Patent Application Ser. No. 61/748,613, filed on Jan. 3, 2013, which is incorporated by reference as if fully set forth.

FIELD OF THE INVENTION

The present disclosure generally relates to strain measurement devices and, more particularly, to electrical resistance strain gages.

BACKGROUND

Discrete resistance trimming for electrical resistance strain gages is known. Known techniques for discrete trimming strain gages do not attempt to establish a uniform grid layout that faithfully tracks an applied strain field and indicates an applied peak strain. U.S. Pat. Nos. 2,885,524 and 5,227,760, and Japanese patent documents 2006-234384 disclose strain gages including discrete trimming without regard to the strain field measured.

Figure 1:
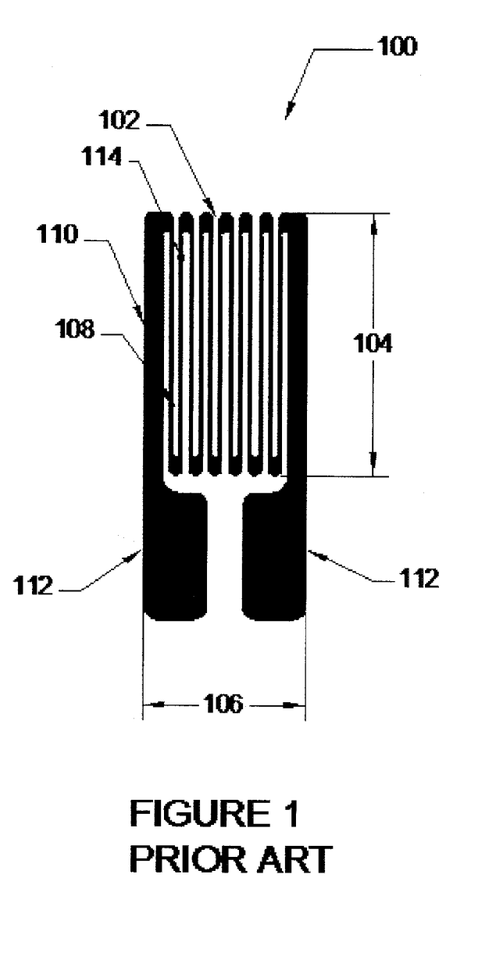
FIG. 1 depicts a top view of a known strain gage.

FIG. 1 illustrated a known linear strain gage 100 with a sinuous base grid 102 that serves two functions: 1) to set the initial resistance; and, 2) to sense the strain field applied beneath it (e.g., from the specimen to which it is attached).

For convenient operation, electrical resistance strain gages must have a resistance value trimmed to a close tolerance. Strain gage grid 102 can be adjusted for electrical resistance by mechanical thinning of the metal alloy from which the strain gage is produced, or by using additional, discrete resistance elements which are introduced to, or removed from, the grid circuit via a trimming operation. The discrete resistance provided by the trimming elements introduced or removed is sometimes referred to as the trim resistance. The resistance of the linear strain gage 100 will be referred to as bulk resistance in this application to distinguish it from the trim resistance.

Electrical strain gages are physical integrators. The grid 102 responds to an applied strain field by changing resistance in such a manner as to average the applied strain magnitude over the active measuring area 108 defined by the grid length 104 and the grid width 106. In its simplest form, this relationship is expressed as:

$$\epsilon = \Delta R/R/F \quad (1)$$

where:
$\epsilon$=applied strain
$\Delta R$=change in grid resistance
$R$=initial, unstrained grid resistance
$F$=transfer coefficient, typically called gage factor This relationship is deceptively simple, and presumes a uniform displacement field applied beneath the grid 102. In reality, the applied displacement field is often a non-uniform function, which the grid will integrate to find the average value impressed upon the active measuring area 108 (grid length 104 X grid width 106).

Figure 2:
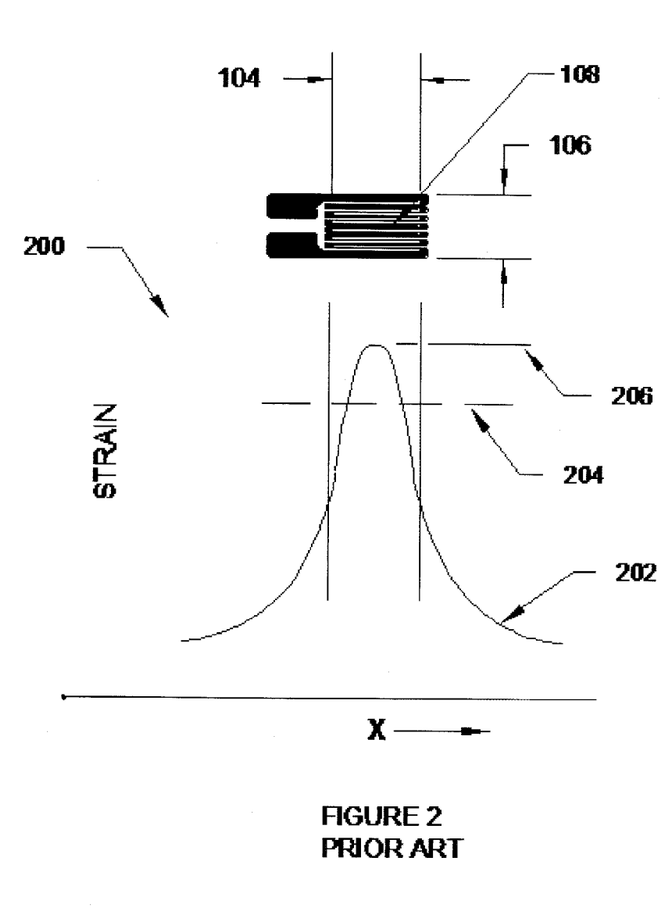
FIG. 2 depicts a representative plot of strain vs. position along the length of the known strain gage of FIG. 1.

The plot 200 in FIG. 2 illustrates a representative prior art plot of strain 202 vs. position X along the length 104 of the strain gage 100 to demonstrate this phenomenon. An exponentially varying strain function is impressed upon the strain gage active measuring area 108. The active grid resistance (the resistance of the active measuring area 108) is changed by the applied strain such that the function is integrated over the active measuring area 108 and the change in grid resistance is proportional to the average magnitude 204 of the applied strain function, averaged over the active measuring area 108.

This integrated value of strain can be much lower than the highest peak value 206 present under the grid. For those applications concerned with structural design, the highest peak value 206 is normally of most interest, because that is the strain magnitude which will cause specimen failure. A measured strain reported lower than peak value can compromise the analysis, possibly resulting in an unsafe structural design.

For those applications concerned with commercial weighing, peak output from the strain gages allows optimum fatigue design and maximum resolution from the weighing transducer. If the strain gage design in some way reduces the possible transducer output, then either the transducer must be designed with higher stress levels (compromising load-cycle life), or the lower output accepted (compromising weighing resolution).

Although the main grid area 108 (e.g., the pattern of contiguous sinuous lines) is the primary sensing zone for the strain gage 100, every contiguous resistance connected between the solder tabs 112 (FIG. 1) for lead wires (not shown) and in contact with the strain field will change proportionally to the applied strain and the initial infinitesimal value of resistance along the path will change proportionally. Therefore, any and all resistance connected between the solder tabs 112 will contribute to the overall resistance change of the gage 100, which is sensed by the instrumentation (not shown) electrically connected to the solder tabs, and becomes part of the overall reported average strain value (e.g., 204). In practice, the ancillary resistance outside the active measuring area 108 is minimized, so as to define the measurement zone as effectively being only the active measuring area 108.

In prior art discrete trimming strain gages, the trim resistance is often introduced to the measuring area (defined by grid length 104 and grid width 106) using partial-length grid lines 114, sometimes with varying angles to the principal measuring direction, and also using additional trimming-resistance areas outside of the primary measuring area, often at varying angles to the primary measuring direction.

Achieving a more accurate measurement of applied peak strain from an electrical resistance strain gage, a measuring area 108 consisting of uniform length grid lines 110 and containing all trim resistance, comprising trimming resistance elements aligned in the principal measuring direction, is desired. The present invention achieves this goal by incorporating the trim resistance with the bulk grid resistance, as opposed to locating the trim resistance outside the active grid area and/or introducing measuring grid lines of varying length to provide required resistance trim steps.

SUMMARY

The optimal electrical resistance strain gage has a uniformly distributed electrical resistance and a grid length and a trim resistance comprising trimming elements within the grid area, wherein the trim resistance is configured to discretely modify an electrical resistance in a circuit of the electrical resistance strain gage while maintaining the same strain sensing area, i.e., the uniformly distributed electrical resistance of the active measuring area.

In some embodiments, an electrical resistance strain gage may comprise a grid area having a grid length, the grid area comprising a plurality of parallel spaced apart inner grid lines forming a uniformly distributed electrical resistance and two outer grid lines; a trim resistance within the grid area, the trim resistance comprising a conductive element having a length corresponding to the grid length interdigitated between adjacent grid lines, a first end of the conductive element electrically connected to a first end of one of the inner grid lines and a second end of the conductive element electrically connected to a second end of one of the inner grid lines; and one or more trim steps disposed on one or both of the outer grid lines wherein the trim resistance is configured to discretely modify an electrical resistance in a circuit of the electrical resistance strain gage while maintaining the same strain sensing area and uniformly distributed electrical resistance of the active measuring area, and wherein the one or more trim steps are configured to discretely modify the electrical resistance in the circuit of the electrical resistance strain gage while maintaining the same strain sensing area and uniformly distributed electrical resistance of the active measuring area.

BRIEF DESCRIPTION OF THE DRAWINGS

The present invention can be understood in more detail with reference to appended drawings and written description.

FIG. 3 A is an exploded view of the encircled portion of FIG. 3.

FIG. 3 B is an exploded view of the portion of FIG. 3 within the rectangular area.

DETAILED DESCRIPTION

Figure 3:
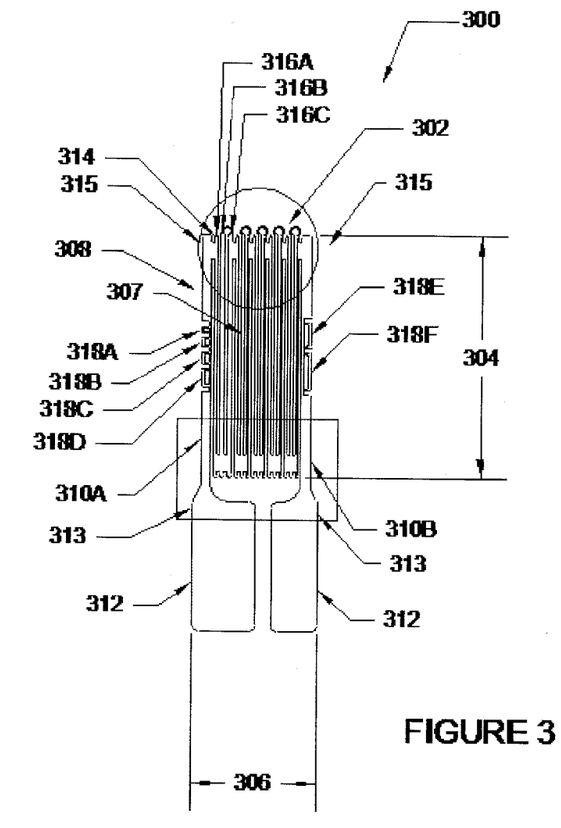
FIG. 3 depicts a top view of a strain gage according to an embodiment of the present invention.

According to one illustration of the present invention, the electrical resistance strain gage 300, comprises a grid 302, having a grid length 304 and a grid width 306, together forming a grid area 308. Two outer grid lines 310a and 310b form the widthwise borders of one or more inner grid lines 314, together forming the grid 302. The outer grid lines 310a and 310b each include a solder tab 312 at the respective first ends 313. Second ends 315 of the outer grid lines 310a and 310b are electrically connected to an inner grid line 314. At least one of the outer grid lines 310a and 310b include one or more selectable discrete trim resistors, trim steps 318a-318f (collectively trim steps 318), disposed at intermediate points between the first and second ends 313 and 315. The trim steps 318 may be used to discretely trim the electrical resistance in the strain gage 300 without affecting the length or uniformly distributed electrical resistance of the outer grid lines 310a, 310b or the inner grid lines 314, as will be described in greater detail below.

Figure 3A:
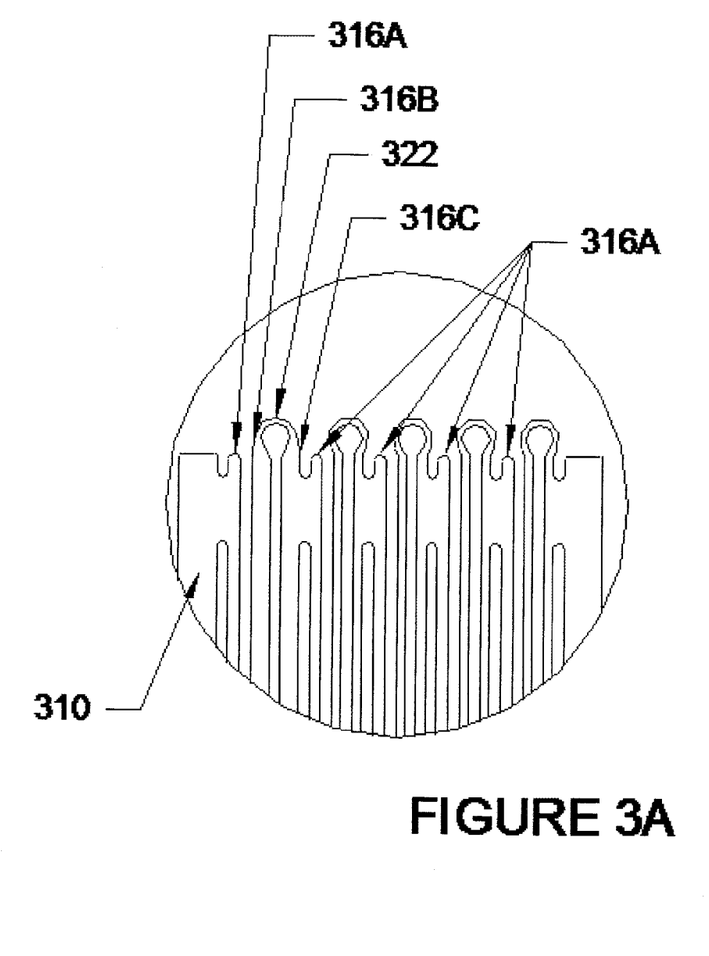
Figure 3B:
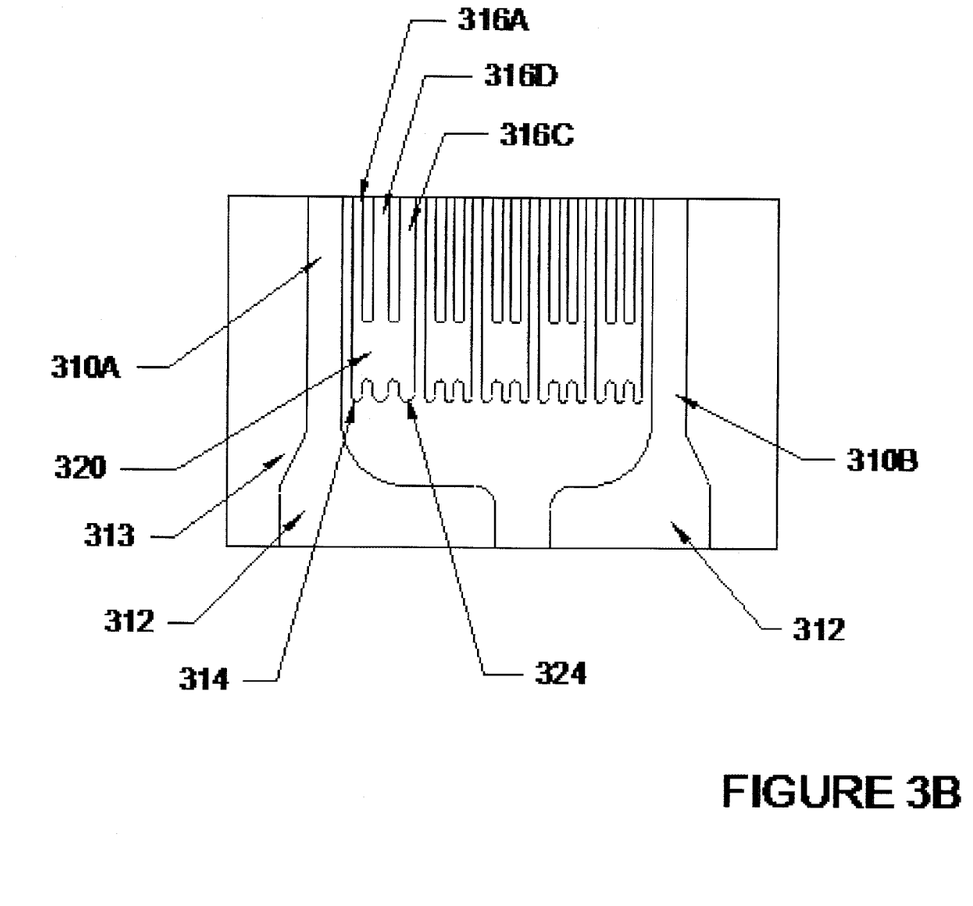

The grid 302 is formed from the outer grid lines 310a and 310b and one or more inner grid lines 314 (5 shown in FIG. 3), arranged in a sinuous pattern (or path) 307. Each inner grid line 314 is formed from a plurality of conductive elements arranged substantially parallel to, and spaced apart from each other. Three electrically conductive elements, conductive elements 316a, 316b, 316c are shown in FIG. 3A for ease of illustration, although other quantities may be used. The conductive elements 316a-316c extend towards the first end 313 and are electrically joined at their lower terminal ends, optionally forming a common lower terminal end, tab 320, as illustrated in FIGS. 3 and 3B. Each inner grid line 314, and accordingly each conductive element 316a, 316b, 316c, have a uniform length corresponding to the base grid length 304 and a uniformly distributed electrical resistance.

As illustrated in FIG. 3A, conductive element 316a is electrically coupled to outer grid line 310a and extends toward the first (lower) end portion 313 of the outer grid line 310a. Five illustrative conductive elements 316a and five conductive elements 316c are shown and function as traditional grid lines arranged in a sinuous pattern 307 parallel and spaced apart as in a conventional strain gage (e.g., linear strain gage 100). Other quantities of conductive elements 316a, 316b may be used. Conductive elements 316b are interdigitated between at least one pair of adjacent conductive elements 316a and 316c. In some embodiments, conductive element 316b is parallel with both adjacent conductive elements 316a and 316c. Conductive element 316b is joined at an upper terminal end to conductive element 316c by an electrical connector 322. In embodiments comprising more than one inner grid line 314, conductive elements 316c of the first (leftmost as drawn) inner grid line 314 is electrically connected to the first conductive element (corresponding to 316a) of the adjacent inner grid line 314 to continue the pattern of sinuous parallel lines comprising the grid 302. The element 316c adjacent to the outer grid line 310b is electrically coupled to the second end 315 of the outer grid line 310b to complete the electrical circuit of the grid 302.

One or both of the outer grid lines 310a and 310b include one or more trim steps 318 comprising electrical paths of varying resistance. The outer grid line 310a and trim steps 318a-318d are similar in function to a series of resistors connected in parallel. As illustrated in FIG. 3, the trim steps 318a-318d are electrically short circuited by a portion of the outer grid lines 310a. By interrupting (i.e., breaking or cutting) one or more portions of the outer grid line 310a short circuiting the trim steps 318a-318d, one or more trim steps are introduced to the grid 302 and the total resistance of the circuit forming the grid 302 can be modified. The outer grid line 310b and trim steps 318e-318f function in a similar manner with similar results.

Trim steps 310a-310d may be interrupted to modify the resistance of the grid 302 by, for example, one or more of laser cutting, abrasion, for example by abrasive powder, knife cutting, or etching by chemical etchant. The processes used to interrupt the trim steps may be a manual process or may be an automatic process, for example a computer controlled process.

Trim step 318 may have different configurations (e.g., length, width, or thickness, or combinations thereof), thereby having varying electrical resistances. Alternatively, the trim steps 318 may all be of the same configuration and have the same, or substantially the same, electrical resistances. Thus, by interrupting a portion of the outer grid lines 310a and 310b and electrically introducing one or more trim steps 318 to the grid 302, the resistance of the grid 302 may be modified discretely without modifying the length of the outer grid lines 310a, 310b or the inner grid lines 314.

Each of the trim steps 318 may be configured to modify the grid 302 resistance by a different discrete amount. Alternately, each may be configured to provide the same modification to the resistance of the grid 302.

Conductive elements 316a and 316c of FIG. 3 may be viewed as the sinuous grid lines of a traditional strain gage. In the present invention, conductive elements 316b are interdigitated between pairs of conductive elements 316a and 316c to provide an electrical path in the grid 302 that may be used as a trim resistor or trim step (similar to 318) to adjust (trim) the resistance of the strain gage 300. The electrical path thus created is parallel in an electrical sense (i.e., electrically parallel) to a portion of the sinuous grid lines formed by conductive elements 316a and 316c. The paths provided by conductive elements 316a-316c are of the same length and have the same uniform electrical resistance, and have the same directional orientation to the sinuous grid lines by virtue of being parallel. Accordingly, the grid 302 may provide an active measuring area, grid area 308, grid length 104 by grid width 106, which does not change in grid length 104 as a result of the trimming operation, thereby providing consistent strain readings regardless of the amount of resistance trimming, which may advantageously yield more accurate measurement of applied peak strain.

The trimming elements in the present approach actively measure the same surface strain in the same direction as the inner grid lines 314. Therefore, the trimming elements are affected by the surface strain in the same way as the inner grid lines, and measure the surface strain in the same manner as the grid area.

Electrical connectors 322 may advantageously be used to modify the total resistance of the circuit forming the grid 302 separately from, or together with, the trim steps 318 as discussed above. As shown in FIG. 3A, electrical connector 322 electrically couples conductive elements 316b and 316c, providing two electrical paths from the lower terminal end (or tab 320) of the inner grid lines 314. Interrupting an electrical connector 322 electrically removes conductive element 316b from the inner grid line 314 of the circuit forming the grid 302. Consequently, the overall resistance of the grid 302 is modified or trimmed, while the length and the uniformly distributed electrical resistance of the outer grid lines 310a, 310b and remaining active conductive elements of inner grid lines 314 remain unchanged. In this regard, conductive element 316b may be considered a trim step as discussed above.

For example, interrupting one electrical connector 322 removes one conductive element 316b from the grid 302 thereby increasing the overall grid resistance by the difference between two parallel conductive elements (316b and 316c) and the single conductive element 316c remaining after the interruption of electrical connector 322 (i.e., by an increase equal to one-half the resistance value of the conductive element 316b). The lengths and uniform resistance of the active grid lines (e.g., 310a, 310b, 316a, and 316c) forming the grid area 308 are not affected by the change in resistance resulting from interrupting one electrical connector 322.

The electrical connectors 322 may be interrupted (i.e., broken or cut) using the same processes as used to interrupt the outer grid lines 310a and 310b as discussed above. The process of interrupting the electrical connectors 322 may be a manual process or may be automated as above.

Some known discrete trimming strain gages include trim steps with resistive elements extending at various angles relative to the desired direction for strain measurement. Since the strain gages average the magnitude of the strain field presented beneath the active measuring area, any resistance primarily in a direction not aligned with the measurement direction may detect spurious strains. The spurious strain may influence the value of the detected strain and lead to readings that differ from the value of the true strain.

When the resistive trim elements are outside the active measurement area (grid length×grid width), the final strain value reported by the strain gage is influenced by strain magnitudes outside measurement area detected by the resistive elements outside of the active measurement area.

Further, some known discrete trimming strain gages include trim steps that are "tacked on" to the gage outside the active measurement area. That is, the added resistive elements may form resistive networks outside the active strain measurement area (grid length×grid width).

The disclosed novel approach maintains trim resistances aligned with the measurement axis. That is, for trimming the inner grid lines, all the trimming steps have resistive elements parallel to the primary measurement direction. Also, since all trimming elements are contained within the grid area, there are no trim elements outside the intended measurement area bounded by the (grid length×grid width.

Selectively interrupting the appropriate combination of trim steps 318 and electrical connectors 322 may facilitate achieving a prescribed resistance of the strain gage 300 within a tolerance of about ±0.20%, for example about ±0.15% of the prescribed resistance. The desired resistance of the strain gage 300 may be achieved using any number of trim steps 318 separately, any number of electrical connectors 322 separately, or any number of trim steps 318 and electrical connectors 322 in combination.

In FIGS. 3, 3A, and 3B, the outer and inner grid lines are illustrated as linear lines for ease of illustration only. In the active measurement areas of other embodiments, the grid lines may not be linear, for example the inner and outer grid lines may be arcuate grid lines (not shown), parallel to, and spaced apart from, each other. Trim steps may be interdigitated between adjacent arcuate grid lines and may be separated from the grid circuit as discussed above. Such strain gages may be useful in measuring strain fields which are not primarily linear (e.g., diaphragm gages designed to measure the circular strain fields from a pressurized, circular, diaphragm spring element). A strain gage with arcuate grid lines would work in a similar fashion to the linear strain gage discussed above, whereby the active grid lines would be oriented parallel to the intended measurement direction which, for this case, would be in an arcuate orientation.

In application, the strain gage 300 may be used individually to respond to one strain field in one orientation (direction of elongation). Alternately, the strain gages 300 may be used in groups of two or more, with each strain gage 300 responding to a strain field in a particular location or in a particular orientation (direction of elongation).

Figure 4:
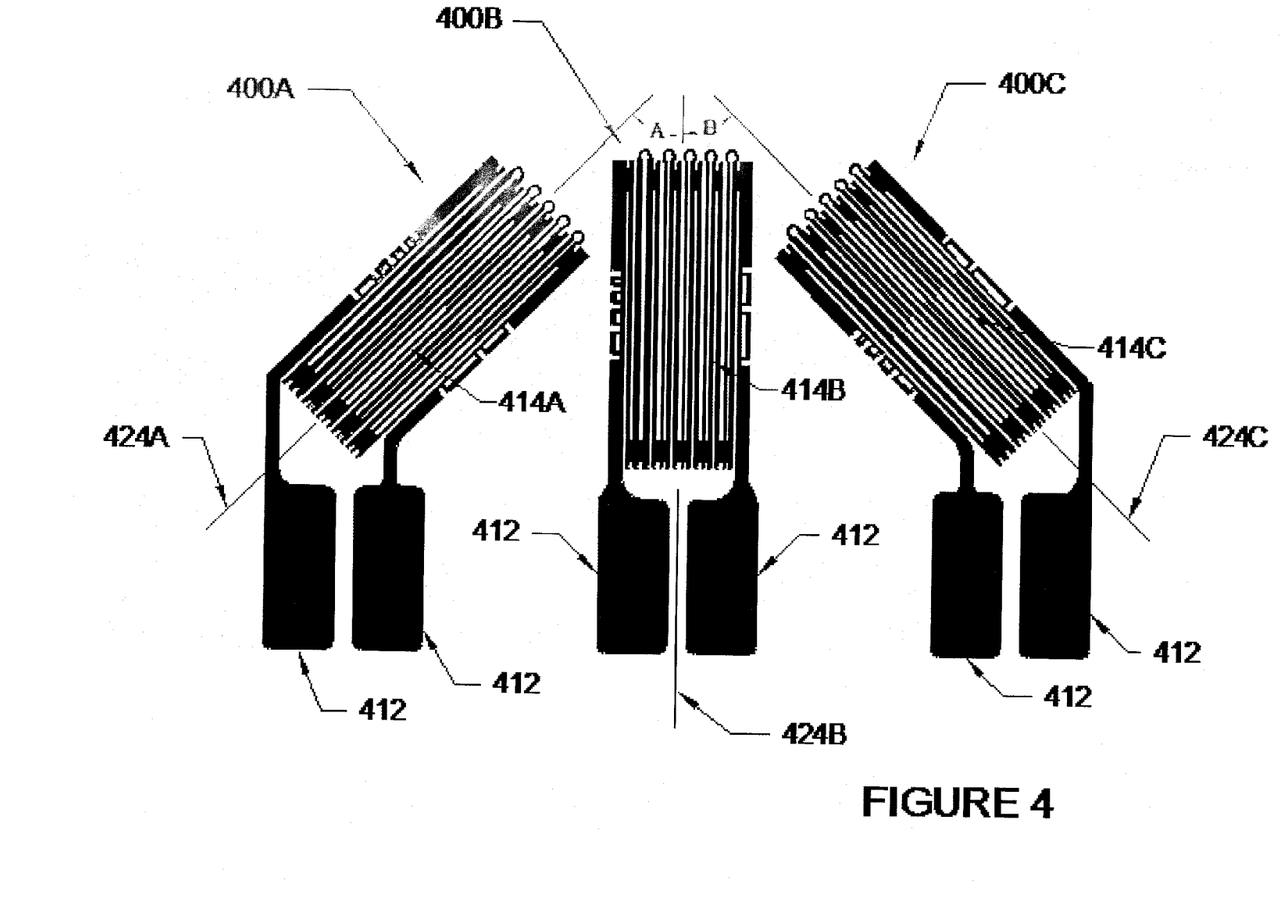
FIG. 4 depicts a representative configuration of three strain gages according to an embodiment of the present invention.

For example, FIG. 4 depicts an exemplary array of three strain gages 400a, 400b, and 400c. As illustrated, strain gage 400b is oriented such that the inner grid lines 414b are aligned with an axis 424b. Strain gage 400a may be oriented such that axis 424a, aligned with inner grid lines 414a, is inclined at an angle A with respect to axis 424b. Similarly, strain gage 400c may be oriented such that axis 424c, aligned with inner grid lines 414c, is inclined at an angle B with respect to axis 424b. Angle A and angle B may be equal in magnitude and opposite in sense from axis 424b. Alternately, angle A and angle B may be different in either, or both, magnitude and sense.

Each strain gage 400a-400c as configured senses a strain field aligned with the respective axis 424a-424c. In the illustrative example of FIG. 4, a three strain gage array is shown, although arrays containing a lesser number, or a greater number, of strain gages may be used. The strain gages may be electrically connected to instrumentation (not shown) via solder tabs 412 to communicate detected strain readings for analysis.

Thus, embodiments of electrical resistance strain gage with improved resistance trimming have been provided herein. In some embodiments, the inventive strain gage with improved resistance trimming may advantageously provide more consistent average strain from an applied strain field. In some embodiments, the inventive strain gage may advantageously provide more consistent representation of peak loads from an applied strain field.

While the foregoing is directed to embodiments of the present invention, other and further embodiments of the invention may be devised without departing from the basic scope thereof.

What is claimed is:

1. An electrical resistance strain gage comprising:
   a grid area having a distributed electrical resistance and a grid length; and
   a trim resistance comprising trimming steps within the grid area,
   wherein the trim resistance is configured to be used to discretely modify an electrical resistance in a circuit of the electrical resistance strain gage while maintaining a same active strain sensing area,
   wherein the grid area comprises outer grid lines, each electrically connected to one or more inner grid lines arranged in a sinuous pattern,
   wherein the trimming steps comprise an electrically conductive element interdigitated between the sinuous pattern of the one or more inner grid lines, and
   wherein a first portion of the electrically conductive element is directly and electrically coupled to a first portion of one of the one or more inner grid lines via an electrical connector and a second portion of the electrically conductive element is directly and electrically coupled to a second portion of the one of the one or more inner grid lines forming an electrical path.

2. The strain gage of claim 1, wherein interrupting the electrical connector removes the electrically conductive element from the circuit and discretely modifies the electrical resistance in the circuit.

3. The strain gage of claim 1, wherein the electrical connector may be interrupted by one or more of laser cutting, abrasion, knife cutting, or chemical etching.

4. The strain gage of claim 1, wherein the electrical conductive element is electrically parallel to a portion of the inner grid line.

5. The strain gage of claim 1, wherein at least one of the outer grid lines comprises one or more selectable discrete trim steps.

6. The strain gage of claim 5, wherein the one or more trim steps are configured to be used to discretely modify the electrical resistance of the electrical resistance strain gage while maintaining the same active strain sensing area and uniform grid length.

7. The strain gage of claim 5, wherein the trim resistance and the one or more selectable trim steps may be used separately to modify the electrical resistance of the electrical resistance strain gage while maintaining the same active strain sensing area and uniform grid length.

8. The strain gage of claim 7, wherein the electrical resistance of the electrical resistance strain gage can be modified to within about −0.15% to about +0.15% of a prescribed resistance.

9. The strain gage of claim 5, wherein the trim resistance may be used in combination with the one or more selectable trim steps to modify the electrical resistance of the electrical resistance strain gage while maintaining the same active strain sensing area and uniform grid length.

10. The strain gage of claim 9, wherein the electrical resistance of the electrical resistance strain gage can be modified to within about −0.15% to about +0.15% of a prescribed resistance.

11. The strain gage of claim 1, wherein the electrically conductive element has a length corresponding to the grid length which does not change as a result of trimming.

12. The strain gage of claim 1, wherein the grid area is an active measuring area.

13. The strain gage of claim 1, wherein the trimming steps extend in the same direction that the grid area actively measures a surface strain.

14. An electrical resistance strain gage comprising:
   a grid area having a grid length, the grid area comprising a plurality of parallel spaced apart inner grid lines forming a distributed electrical resistance and two outer grid lines;
   a trim resistance within the grid area, the trim resistance comprising a conductive element having a length corresponding to the grid length interdigitated between adjacent inner grid lines, a first end of the conductive element directly and electrically connected to a first end of one of the inner grid lines and a second end of the conductive element directly and electrically connected to a second end of the one of the inner grid lines; and
   one or more trim steps disposed on one or both of the outer grid lines,
   wherein the trim resistance is configured to discretely modify an electrical resistance in a circuit of the electrical resistance strain gage while maintaining the same active strain sensing area and uniform grid length, and wherein the one or more trim steps are configured to be used to discretely modify the electrical resistance in the circuit of the electrical resistance strain gage while maintaining a same active strain sensing area and uniform grid length.

* * * * *